United States Patent
Jenn

(10) Patent No.: US 10,209,149 B2
(45) Date of Patent: Feb. 19, 2019

(54) INSTALLATION METHOD AND AN APPARATUS OF A SENSOR BASED ON STRAIN GAUGES TO GENERATE DEFORMATION SIGNALS CAUSED BY AN APPLIED FORCE

(71) Applicants: Taiwan Hodaka Industrial Co., Ltd., Taipei (TW); Su Tai Inc., Tainan (TW)

(72) Inventor: Paul Jenn, Taipei (TW)

(73) Assignees: Taiwan Hodaka Industrial Co., Ltd., Tainan (TW); Su Tai Inc., Tainan (TW)

(*) Notice: Subject to any disclaimer, the term of this patent is extended or adjusted under 35 U.S.C. 154(b) by 8 days.

(21) Appl. No.: 15/353,890

(22) Filed: Nov. 17, 2016

(65) Prior Publication Data
US 2017/0370785 A1 Dec. 28, 2017

(30) Foreign Application Priority Data
Jun. 28, 2016 (TW) .............................. 105120275 A

(51) Int. Cl.
| | |
|---|---|
| G01L 1/00 | (2006.01) |
| G01L 1/22 | (2006.01) |
| G01L 5/22 | (2006.01) |

(52) U.S. Cl.
CPC .......... *G01L 1/2206* (2013.01); *G01L 1/2287* (2013.01); *G01L 5/225* (2013.01)

(58) Field of Classification Search
CPC .... G01B 7/16; G01B 7/18; G01B 5/30; G01L 1/2206; G01L 1/2287; G01L 5/225;
(Continued)

(56) References Cited

U.S. PATENT DOCUMENTS

| | | | |
|---|---|---|---|
| 6,356,848 B1* | 3/2002 | Cote .......................... | G01L 3/24 702/44 |
| 7,814,800 B2* | 10/2010 | Roovers .................... | B62M 6/50 73/760 |

(Continued)

FOREIGN PATENT DOCUMENTS

| | | |
|---|---|---|
| CN | 1806161 A | 7/2006 |
| TW | 201522160 A | 6/2015 |

(Continued)

*Primary Examiner* — Harshad R Patel
*Assistant Examiner* — Nigel Plumb
(74) *Attorney, Agent, or Firm* — Alan D. Kamrath; Kamrath IP Lawfirm, P.A.

(57) ABSTRACT

An installation method and an apparatus of a strain gauge sensor are capable of driving an object to be measured to generate a deformation signal by a pushing/pulling force. At least two strain gauge sensors are installed on surfaces with different amounts of deformation and at an installation location of an electrical vehicle according to the installation method. The installation method includes Method 1: When a manual pushing/pulling force is applied, the installation location is deformed and the deforming action force is directly proportional to the pushing/pulling force. Method 2: When the pushing/pulling force is applied, the vehicle deforming direction at the installation location is independent to the pushing/pulling force moving direction. Method 3: The strain detecting direction of the strain gauge sensor is the same as the vehicle deforming direction at the installation location. Therefore, pulling or driving force data can be measured accurately.

6 Claims, 5 Drawing Sheets

(58) Field of Classification Search
CPC ..... G01L 1/22; G01L 1/12; G01L 1/00; G01L 3/00; B62M 6/50; G01N 3/08
USPC .................................. 73/768, 763, 781, 760
See application file for complete search history.

(56) References Cited

U.S. PATENT DOCUMENTS

| | | | | |
|---|---|---|---|---|
| 7,817,800 B2* | 10/2010 | Wack | .................... | H04L 9/0869 |
| | | | | 380/200 |
| 8,370,087 B2 | 2/2013 | Zhu et al. | | |
| 9,322,725 B2* | 4/2016 | Tetsuka | .................... | G01L 3/247 |
| 2009/0120211 A1* | 5/2009 | Roovers | .................... | B62M 6/50 |
| | | | | 73/862.474 |
| 2010/0050785 A1* | 3/2010 | Roessingh | ............... | B62M 9/12 |
| | | | | 73/862.191 |
| 2011/0040500 A1* | 2/2011 | Zhu | ........................... | G01L 1/22 |
| | | | | 702/44 |
| 2011/0040600 A1* | 2/2011 | Paknad | .................. | G06Q 10/10 |
| | | | | 705/7.42 |
| 2012/0152033 A1* | 6/2012 | Hsiao | ...................... | G01L 5/102 |
| | | | | 73/862.69 |
| 2013/0014596 A1* | 1/2013 | Hsu | ........................ | G01L 3/1435 |
| | | | | 73/862.635 |
| 2014/0174237 A1* | 6/2014 | Watarai | .................... | B62L 3/023 |
| | | | | 74/489 |
| 2015/0019062 A1* | 1/2015 | Previdi | ..................... | B60L 7/12 |
| | | | | 701/22 |
| 2016/0008663 A1* | 1/2016 | Zhu | ......................... | G01L 3/242 |
| | | | | 482/8 |

FOREIGN PATENT DOCUMENTS

| | | |
|---|---|---|
| TW | I604992 B | 11/2017 |
| WO | WO 01/30643 A1 | 5/2001 |
| WO | WO 03/073057 A1 | 9/2003 |

\* cited by examiner

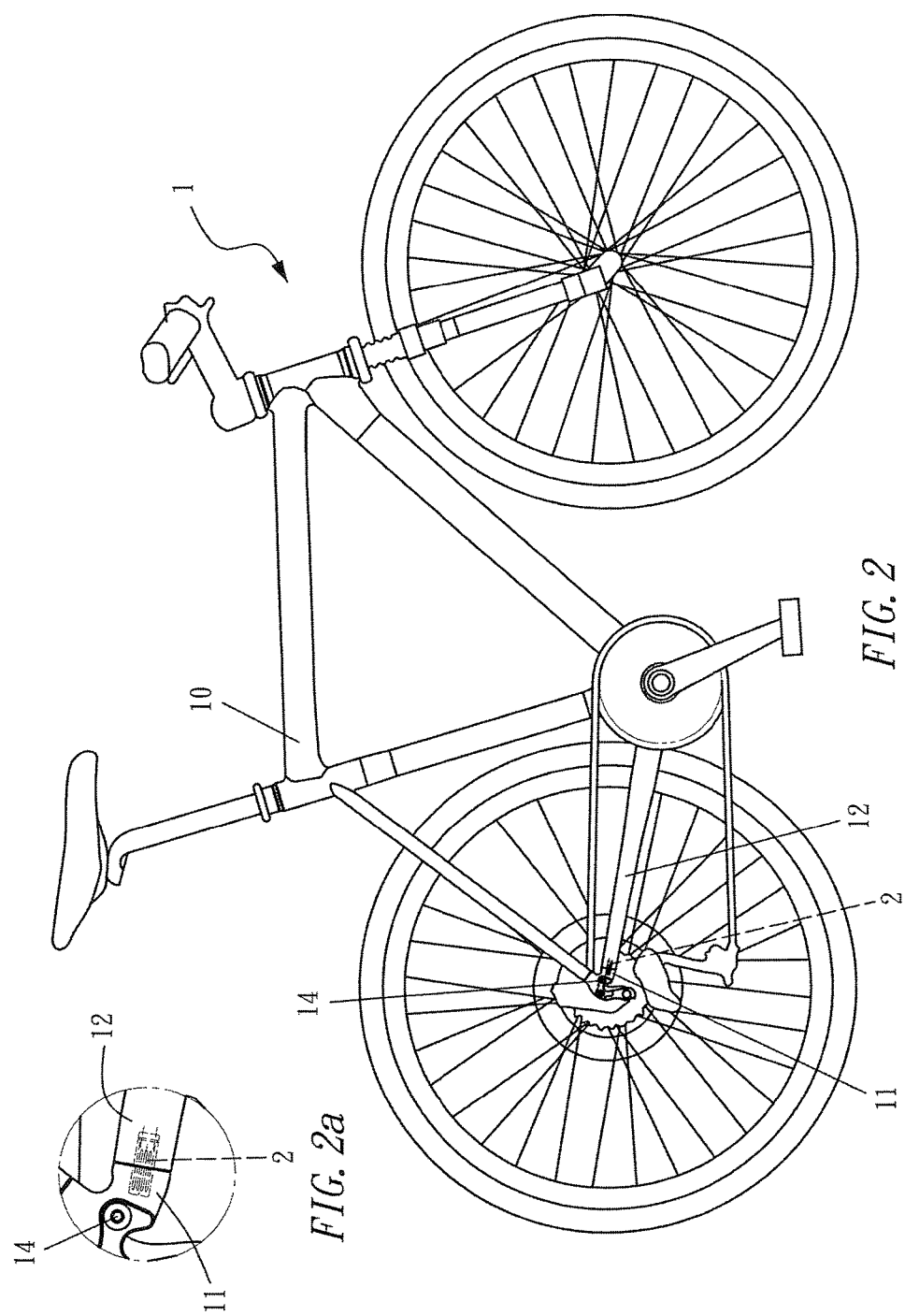

INSTALLATION METHOD AND AN APPARATUS OF A SENSOR BASED ON STRAIN GAUGES TO GENERATE DEFORMATION SIGNALS CAUSED BY AN APPLIED FORCE

BACKGROUND OF THE INVENTION

Field of the Invention

The present invention relates to an installation method and an apparatus of a sensor based on a strain gauge to generate deformation signals caused by an applied force and, more particularly, to the installation method and apparatus of the sensor without generating feedback signals when the signal is used to control an auxiliary motor which propels a power-assist type of vehicle such as an electric bicycle and a wheelchair.

Description of the Related Art

An electric bicycle and, in particular, a pedelec is a bike having an electrical auxiliary motor, and the degree of assist is proportional to the user's pedal force. In other words, the greater the pedaling force, the greater the power the auxiliary motor supplies. In a conventional way of measuring a pedaling force as disclosed in WO2001030643 A1, the magnitude of a deformation signal of a bike frame is used to measure the rider's effort (power). As disclosed in CN1806161 A, a tension difference measuring device is installed onto a chain for measuring a torque variation signal transmitted by the chain when a pedaling force is applied to a bike by a bicycle rider. As disclosed in WO-03/073057, the amount of curved deformation is measured when a user applies a pedaling force. As disclosed in U.S. Pat. No. 7,814,800B2 and U.S. Pub. No. 2011/0040500A1, a strain gauge sensor is installed at the position of a rear dropout of a bicycle for measuring a deformation signal of the rear dropout when a bicycle rider applies a pedaling force.

In U.S. Pat. No. 7,814,800 B2, a weakened rear fork (dropout 50 as shown in FIG. 3A) is installed as a rear dropout of a bike frame and provided for supporting an end of a hub. The rear fork has a precision-cut slot (55) formed in a vertical direction, so that the rear fork has a deformable area. An end of a measuring cell (70) is disposed in the deformable area, and the other opposite end of the measuring cell (70) is disposed at a position away from the deformable area of the rear fork, so that the measuring cell (70) can measure a deformation signal of the rear dropout when a bicycle rider applies a pedaling force. However, the application of U.S. Pat. No. 7,814,800B2 has the following drawbacks:

1. The weakened rear fork is an additional accessory which is needed to construct a complete bike, and its manufacturing not only requires an additional mold and precision cutting, but also requires a modification of the frame for the fixation of the rear fork, thus incurring a higher manufacturing cost. In addition, once the rear fork is removed, the bike cannot be ridden anymore.

2. The deforming direction of the rear fork is the same as the direction for the auxiliary motor that pushes the vehicle, so that feedbacks occur when the auxiliary motor drives the hub, which also generates a deformation signal of the rear fork. Thus, the auxiliary motor cannot provide accurate power as desired, if the deformation signal can be obtained at all (see 3 below). As a result, the riding process is un-intuitive and unnatural.

3. The measuring cell (70) is a strain gauge sensor that measures stress by a change of resistance value of a metal conductive wire in the strain gauge sensor. When the strain gauge sensor is stretched, the conductive wire becomes narrower and longer, so that the resistance value increases. On the other hand, when the strain gauge sensor is compressed, the conductive wire becomes wider and shorter, so that the resistance value decreases. Therefore, the attached strain gauge sensor and the testing body must be treated as a whole, and the measuring direction must be parallel to the deforming direction of the testing body. In U.S. Pat. No. 7,814,800B2, the measuring cell (70) as shown in FIG. 3A, however, is in the vertical direction to the deforming direction of the rear fork (for a correct installation, the measuring cell (70) should, instead, be installed parallel to the weakened slot (55) as shown in FIG. 3A (for example, on the edge surface of leg 62). Even so, the signal feedback problem as mentioned in 2 above still cannot be avoided.

In U.S. Pub. No. 2011/0040500 A1, two strain gauge sensors 30a, 30b as shown in FIG. 8 are installed on two opposite inner sides of two rear dropouts respectively. This arrangement of the paired strain gauge will be compressed or stretched in sync, since the deformation of two dropouts where the axle of wheel is installed actually both are stretched or compressed in the same time. Therefore, the deformation signals detected by the two strain gauge sensors as disclosed in U.S. Pub. No. 2011/0040500 A1 will offset each other. In addition, when the installation location of the strain gauge sensor 30 as shown in FIG. 2 and FIG. 9 is situated exactly where the hub is bolted to the bike frame, the strain gauge sensors 30 cannot avoid being interfered with or even damaged.

SUMMARY OF THE INVENTION

In view of the aforementioned drawbacks of the applications as disclosed in U.S. Pat. No. 7,814,800B2 and U.S. Pub. No. 2011/0040500 A1, the present invention provides a solution to overcome the drawbacks of the prior art. Moreover, it provides a method that allows easy installation of the sensor without altering the basic design of the vehicle.

Therefore, it is a primary objective of the present invention to provide an installation method and apparatus of a strain gauge sensor capable of generating and measuring a deformation signal caused by an applied force. The present invention is applied to an electrical vehicle such as an e-bike and an electric wheelchair having an auxiliary power and capable of obtaining an applied force (or driving force) signal without receiving the feedback signals generated by the auxiliary motor, thereby supplying a correct auxiliary power to the electrical vehicle and making the riding of the electrical vehicle intuitive and bionic.

To achieve the aforementioned objective, the present invention provides a strain gauge sensor installed to a defined location of the vehicle frame, and the chosen location, coupled with the installation method satisfies the following methods:

Method 1: when a manual pushing/pulling force is applied to the installation location of an electrical vehicle, the location of the frame is deformable and the degree of vehicle deformation is directly proportional to the applied pushing/pulling force;

Method 2: when the pushing/pulling force is applied, the direction of vehicle deformation of the chosen location is independent to the direction of applied force (for example, the direction of the force can be to-and-fro while that of the vehicle deformation can be left-and-right); and Method 3: the direction of the strain gauge sensor is parallel to the direction of vehicle deformation at the installation location.

The strain gauge sensor of the present invention is installed onto a location of an electrical vehicle frame according to the aforementioned installation method, and the strain gauge sensor comprises a metal plate and two strain gauge sensors. The two strain gauge sensors are attached onto both sides of the metal plate respectively, and two ends of the metal plate are secured onto a side surface of the installation location. With the aforementioned configuration, the magnitude of a rider's pedaling force produces a corresponding vehicle deformation at the installation location, causing changes in the resistance values of the two strain gauge sensors. With a common electrical circuitry, this changing resistance is converted to a voltage signal and is processed with a microprocessor which controls the auxiliary motor to provide a directly proportional power.

The strain gauge sensor of the present invention is installed to an installation location according to the aforementioned installation method, and the strain gauge sensor comprises two strain gauge sensors attached onto two, opposite, left and right sides of the installation location respectively. With the aforementioned configuration, the magnitude of a rider's pedaling force produces a corresponding vehicle deformation at the installation location, causing changes in the resistance values of the two strain gauge sensors. With a common electrical circuitry, this changing resistance is converted to a voltage signal and is processed with a microprocessor which controls the auxiliary motor to provide a directly proportional power.

BRIEF DESCRIPTION OF THE DRAWINGS

FIG. 2 is a side view of a strain gauge sensor applied to an electrical vehicle (or a wheelchair) of the present invention;

FIG. 2a is a partial blowup view of FIG. 2;

DETAILED DESCRIPTION OF THE PREFERRED EMBODIMENTS

The technical characteristics, contents, advantages and effects of the present invention will be apparent with the detailed description of preferred embodiments accompanied with related drawings as follows.

The present invention is applicable to an electrical vehicle such as an e-bike or a wheelchair with an auxiliary power. The electrical vehicle is driven by an auxiliary motor, so that the rider can ride the above-mentioned electrical vehicles with less effort. In the present invention, a strain gauge sensor is installed at a location of the electrical vehicle frame to measure the degree of vehicle deformation which is proportional to the force applied. When a manual driving force (such as a pedaling force applied to a bicycle pedal) causes a vehicle deformation at the installation location of the electrical vehicle frame and the strain gauge sensor, the strain gauge sensor detects a deformation signal, and the magnitude of the deformation signal is used to control an auxiliary motor to provide power directly proportional to the amount of vehicle deformation. The larger the driving force, the larger the deformation signal, so that interference of feedback signals from the auxiliary motor will not occur. As a result, a precise assistive power is supplied by the auxiliary motor.

Figure 1:
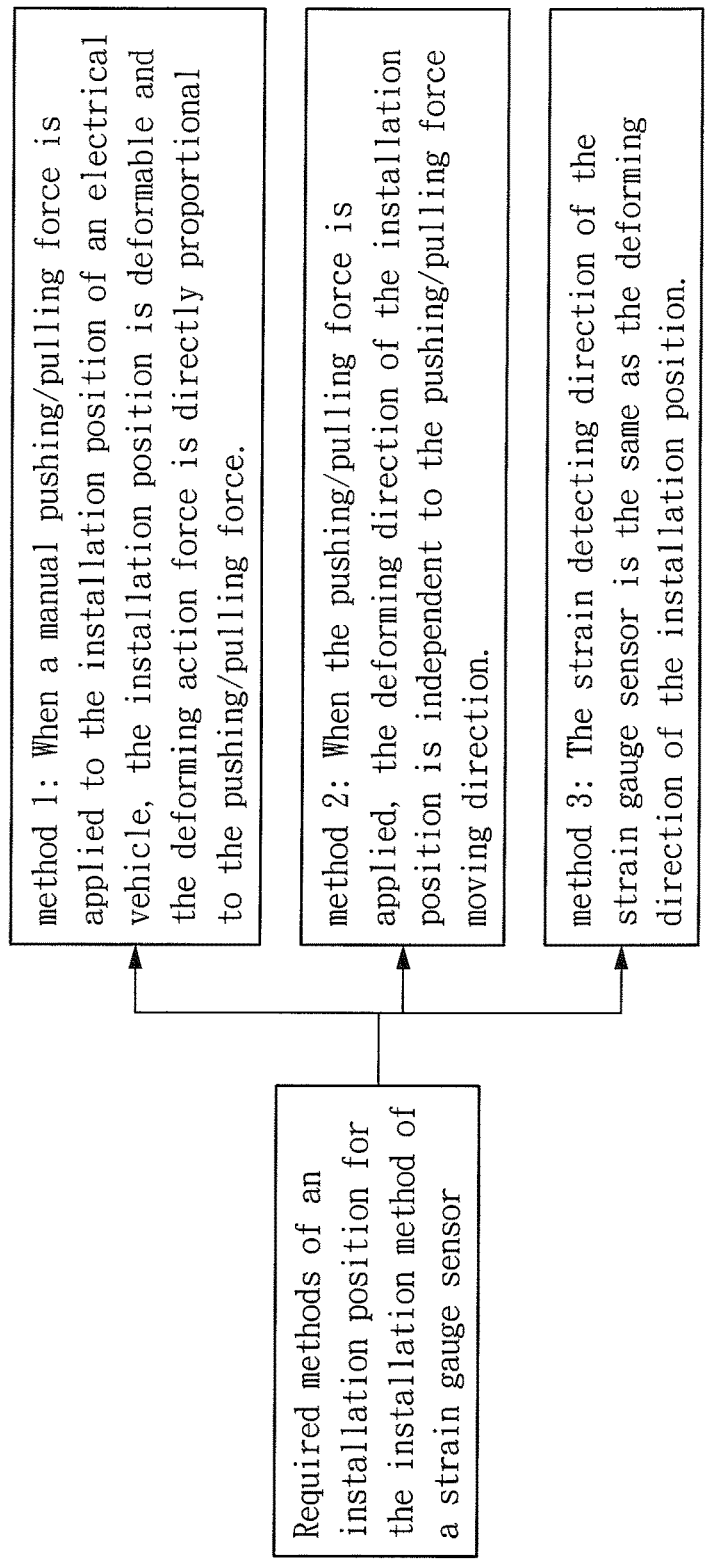
FIG. 1 is a flow chart of an installation method of a preferred embodiment of the present invention.

In FIGS. 1, 2, and 2a, a strain gauge sensor 2 is installed at an installation location 11 of a frame 10 of an electrical vehicle 1 in accordance with the present invention. The installation location 11 configured (or selected) satisfies the following methods:

Method 1: When a manual pushing/pulling force (such as a pedaling force applied by a rider to a bicycle pedal, the pedaling force delivered to the hub, through a driving chain; or a driving force produced by pushing the hand-wheel of a wheelchair) is applied to the electrical vehicle 1, the strain gauge sensor 2 installed at the installation location 11 of the electrical vehicle 1 is also deformed, and the deforming action force is directly proportional to the pushing/pulling force.

Method 2: The direction of the vehicle deformation caused by an applied force at the installation location 11 is independent to the direction of applied pushing/pulling force. Thus, the force generated by the auxiliary motor will not be further detected by the sensor. The undesired feedback is a common problem when the direction of vehicle deformation by manual force is the same with that by the assistive force, generating an undesirable feedback signal caused by the torque of the auxiliary motor. With method 2 achieved by the current invention, the manual force is accurately obtained. As a result, the auxiliary motor supplies a correct assistive power.

Figure 5:
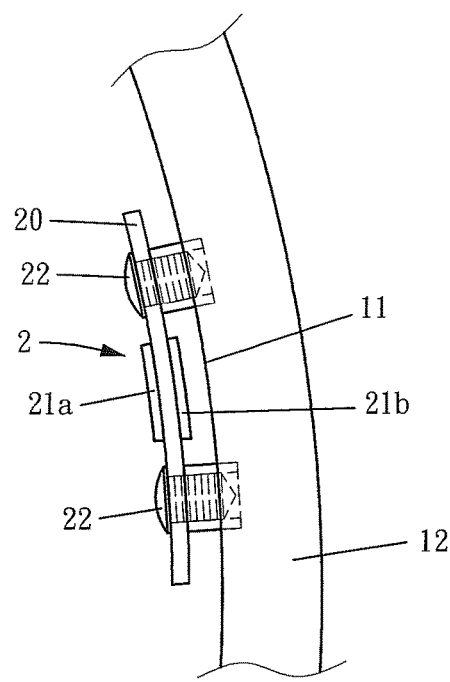
FIG. 5 is a planar view showing the vehicle deformation of a chain stay, a metal plate and two strain gauge sensors as shown in FIG. 3 after a driving force is applied to the electrical vehicle.

Method 3: When the pushing/pulling force is manually applied to the installation location 11, the vehicle deforming direction is the same as that of the strain gauge sensor 2. When the vehicle deforming direction at the installation location 11 and the strain detecting direction of the strain gauge sensor 2 are the same, the strain gauge sensor 2 measures the amount of vehicle deformation at the installation location 11 correctly as shown in FIGS. 5 and 7.

In the aforementioned Method 2, the vehicle deforming direction at the installation location 11 of the strain gauge sensor 2 is independent to the manual pushing/pulling force direction. In other words, the direction of vehicle deformation caused by the manual force at the installation location 11 is different from that of the applied force itself. The degree of vehicle deformation measured by the sensor is directly proportional to the manual force applied. The installation location 11 may be situated at a location between angles of positive and negative 30 degrees with respect to the parallel axis of the direction of applied manual force. The aforementioned installation location 11 refers to the position of a right chain stay 12 of a bicycle and within 15 cm away from the rear hub 14 and preferably within 10 cm away from the rear hub 14 (as shown in FIG. 2*a*). The installation location 11 also refers to the position where the right dropout is parallel to where the left dropout joins the chain stay.

Figure 3:
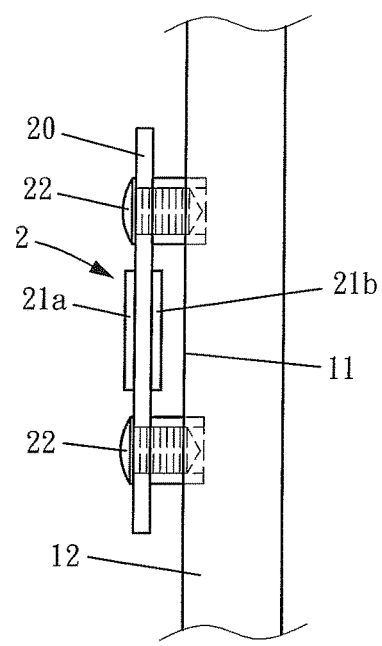
FIG. 3 is a planar view of a first type of strain gauge sensor installed onto a side surface of a chain stay of an electric bicycle of the present invention.
Figure 4:
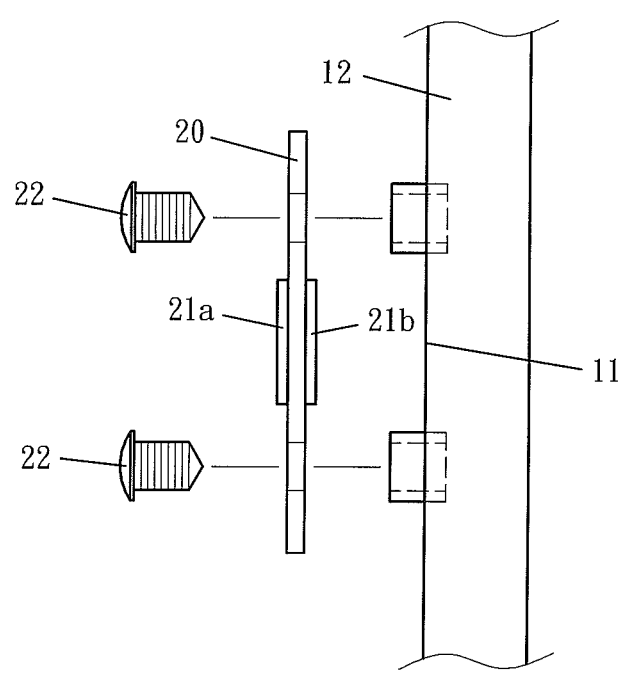
FIG. 4 is an exploded view of the first type of strain gauge sensor installed onto a side surface of a chain stay of an electric bicycle of the present invention.
Figure 8:
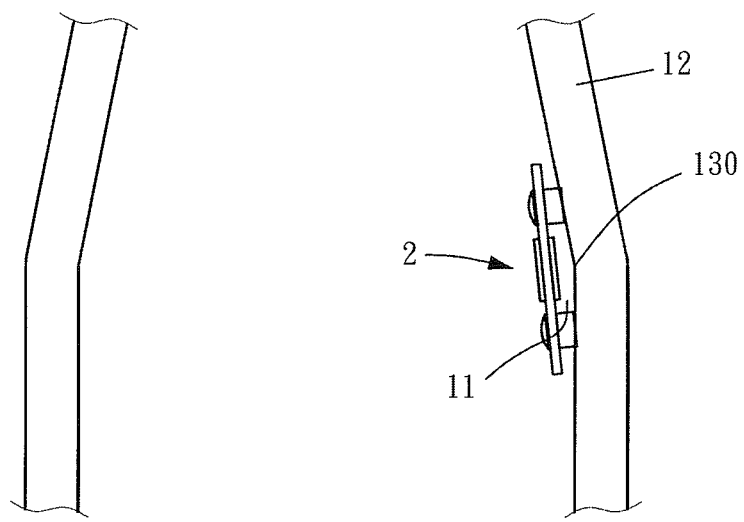
FIG. 8 is a reference view of the preferred embodiment showing a strain gauge sensor installed at a location where a right chain stay of a bicycle bends towards a bottom bracket.

The strain gauge sensor of the present invention may be installed by the following two methods. Method 1. The strain gauge sensor 2 installed to the installation location 11 according to the aforementioned installation method as shown in FIGS. 3~5 comprises an elastic metal plate 20 and two strain gauge sensors 21*a*, 21*b* attached onto corresponding surfaces on the both sides of the elastic metal plate 20, and the two ends of the elastic metal plate 20 are secured to a side surface of the installation location 11. The aforementioned installation location 11 is preferably situated on a side surface of the right chain stay 12 facing the rear hub. With the aforementioned configuration, the elastic metal plate 20, the two strain gauge sensors 21*a*, 21*b*, and the right chain stay 12 are combined as a whole and deforms as a whole. In addition, the structure of this sort has several advantages: since both ends of the elastic metal plate 20 of the strain gauge sensor 2 may be secured to the installation location 11 of the frame 10 by the screw 22 after the frame 10 of the electrical vehicle 1 is painted and finished, without the need of fixing the two strain gauge sensors 21*a*, 21*b* to the installation location 11 prior to painting, thus making the manufacturing process smoother. It also provides an opportunity to repair or replace the sensor unit. When a rider applies a pushing/pulling force to the electrical vehicle 1 (such as an electric bicycle or an electric wheelchair), the installation location 11 of the frame 10 is deformed, causing the elastic metal plate 20 to deform accordingly. The degree of vehicle deformation is measured via two strain gauge sensors 21 installed on both sides of the elastic metal plate 20, generating signals to be used in controlling the auxiliary motor to supply a directly proportional power to the electrical vehicle 1. The installation location 11 of the strain gauge sensor 2 is positioned on the right chain stay before the dropout, where the chain stay bends towards the bottom bracket, with the strain gauge sensor 2 spans over the obtuse angle of the bend 130 as shown in FIG. 8.

Figure 6:
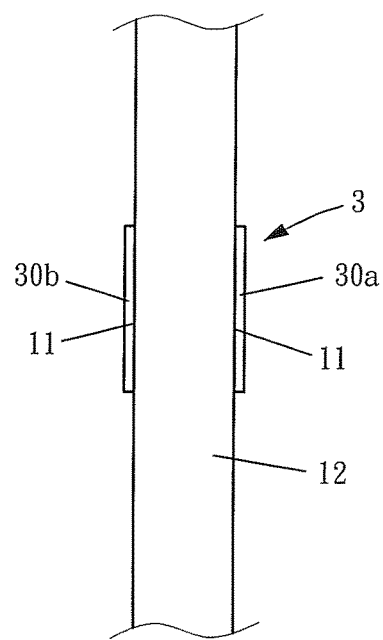
FIG. 6 is a schematic view of two strain gauge sensors of a second type installed to both side surfaces of a chain stay of an electric bicycle respectively in accordance with the present invention.
Figure 7:
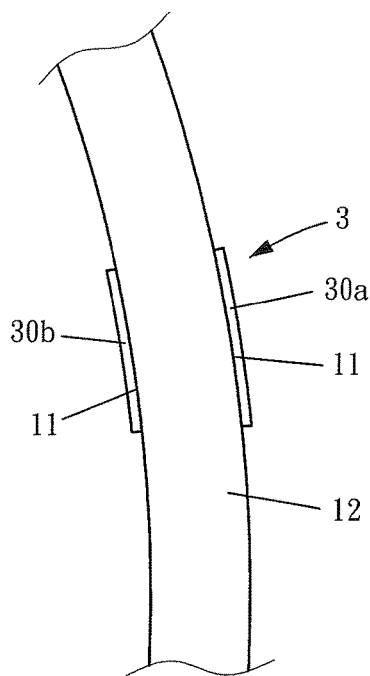
FIG. 7 is a schematic view showing the vehicle deformation of a chain stay and two strain gauge sensors as shown in FIG. 6 after a driving force is applied to an electrical vehicle.

The second type of strain gauge sensor 3 of the present invention is installed to an installation location 11 according to the aforementioned installation method, and this type of strain gauge sensor 3 also comprises two strain gauge sensors 30*a*, 30*b* as shown in FIGS. 6 and 7. The two strain gauge sensors 30*a*, 30*b* are attached onto two corresponding left and right sides of the installation location 11, and the two strain gauge sensors 30*a*, 30*b* and the installation location 11 of the frame 10 are deformed as a whole. With the aforementioned configuration, when a rider applies a pushing/pulling force to the electrical vehicle 1, the installation location 11 of the frame 10 is deformed, and the resistance values of the two strain gauge sensors 30*a*, 30*b* are accordingly changed, generating the deformation signal which is used to control the auxiliary motor to provide a directly proportional power to the electrical vehicle.

It is noteworthy that the vehicle deforming and displacing directions as disclosed in U.S. Pat. No. 7,814,800B2 are forward and backward directions, but the vehicle deforming and displacing directions of the present invention are left and right directions, and thus the two are different. U.S. Pat. No. 7,814,800B2 relies on a weakened dropout plate to measure the amount of vehicle deformation. However, the present invention does not require such additional dropout plate. The metal plate of the present invention is an addition to, but not part of, the bike frame, and is installed conveniently for measuring the vehicle deformation caused by the applied manual force only. If the rear fork as disclosed in U.S. Pat. No. 7,814,800B2 is removed, the electrical vehicle cannot be ridden anymore. On the other hand, a rider still can ride the electrical vehicle of the present invention in the same situation as a normal bike.

According to the installation method of the present invention, the strain gauge sensor is installed to the installation location of the vehicle frame, and the strain gauge sensor will not be affected by the driving force when the auxiliary motor is driven, and feedback information will not be produced when the auxiliary motor is rotated, so that the riding of the electrical vehicle achieves intuitive and bionic effect.

While the invention has been described by means of specific embodiments, numerous modifications and variations could be made thereto by those skilled in the art without departing from the scope and spirit of the invention set forth in the claims.

What is claimed is:

1. An installation method comprising:
providing a vehicle including a frame, an axle fixed to the frame in a non-movable manner relative to the frame, a hub rotatable on the axle, a pedal rotatably mounted to the frame, and a driving chain extending between the pedal and the hub, with the frame including a right chain stay, wherein the chain stay includes first and second elongated portions integrally connected at a bend having an obtuse angle between the first and second elongated portions; and
installing a strain gauge sensor at an installation location of the right chain stay situated on a side surface facing the hub and spaced from the axle and the pedal, wherein the strain gauge sensor spans between the first and second elongated portions and over the obtuse angle of the bend, with the strain gauge sensor generating a deformation signal measuring a pushing/pulling force applied by the driving chain, with the installation location of the strain gauge sensor satisfying the following conditions:
Condition 1: when the pushing/pulling force is applied by the pedal to the installation location of the vehicle, the installation location is deformable and a deforming action force is directly proportional to the pushing/pulling force;
Condition 2: when the pushing/pulling force is applied, the vehicle deforming direction at the installation location is independent to a pushing/pulling force moving direction; and
Condition 3: a strain detecting direction of the strain gauge sensor is in a same direction as a vehicle deforming direction at the installation location.

2. The installation method according to claim 1, wherein installing comprises installing the strain gauge sensor at the installation location situated at a position between angles of positive and negative 30 degrees with respect to a parallel axis of the pushing/pulling force moving direction.

3. The installation method according to claim 2, wherein installing comprises installing the strain gauge sensor at the installation location is situated at the right chain stay of the frame proximate to a chain end and within 10 cm away from the hub.

4. The installation method according to claim 3, wherein installing comprises installing the strain gauge sensor at the installation location situated at a position 5 cm away from the hub.

5. The installation method according to claim 2, wherein installing comprises installing the strain gauge sensor comprising an elastic metal plate and two strain gauge sensors, attaching the two strain gauge sensors onto two opposite left and right sides of the elastic metal plate respectively, and securing both ends of the metal plate onto the first and second elongated portions, respectively, at the side surface of the installation location, and wherein the installation location is at the right chain stay positioned before a dropout in the frame.

6. The installation method according to claim 1, wherein installing comprises installing the strain gauge sensor comprising an elastic metal plate and two strain gauge sensors, attaching the two strain gauge sensors onto two opposite left and right sides of the metal plate respectively, and securing both ends of the metal plate onto the side surface of the installation location.

* * * * *